(12) United States Patent
Larsen et al.

(10) Patent No.: US 6,929,028 B2
(45) Date of Patent: Aug. 16, 2005

(54) GAS CONTROL ASSEMBLY

(75) Inventors: Todd W. Larsen, Milaca, MN (US); Thomas M. Bydalek, Blaine, MN (US)

(73) Assignee: Tescom Corporation, Elk River, MN (US)

( * ) Notice: Subject to any disclaimer, the term of this patent is extended or adjusted under 35 U.S.C. 154(b) by 0 days.

(21) Appl. No.: 10/875,414

(22) Filed: Jun. 24, 2004

(65) Prior Publication Data

US 2004/0231734 A1 Nov. 25, 2004

Related U.S. Application Data

(63) Continuation-in-part of application No. 10/361,328, filed on Feb. 10, 2003, now abandoned.

(51) Int. Cl.[7] .............................................. F16K 24/00
(52) U.S. Cl. .................. 137/613; 137/505.25; 137/588; 137/594; 137/614.19
(58) Field of Search ................... 137/505, 588, 137/594, 614.19, 613, 505.25

(56) References Cited

U.S. PATENT DOCUMENTS

| | | |
|---|---|---|
| 5,458,151 A | 10/1995 | Wass |
| 5,562,117 A | 10/1996 | Borland et al. |
| 6,041,762 A | 3/2000 | Sirosh et al. |
| 6,142,128 A * | 11/2000 | Gobbi ........................ 137/613 |
| 6,186,168 B1 * | 2/2001 | Schultz et al. ......... 137/505.25 |
| 6,675,831 B2 * | 1/2004 | Sakaguchi et al. .......... 137/613 |
| 6,691,729 B2 * | 2/2004 | Takeda et al. .............. 137/613 |

\* cited by examiner

*Primary Examiner*—Kevin Lee
(74) *Attorney, Agent, or Firm*—Clayton R. Johnson (57) ABSTRACT

The gas control assembly includes a control body threaded to a vessel neck to extend into the vessel containing pressurized fluid and has a fitting in the body bore which in conjunction therewith provides a part of a first fluid passageway from an inlet in the vessel and an outlet to the ambient atmosphere. A manually operated valve and a pressure regulator are provided in the first passageway exterior of the vessel. In one embodiment the control body has a second passageway opening through a relief device to the vessel interior and to the ambient atmosphere while in a second embodiment a relief device is provided exterior of the vessel and opens to the first passageway. A main valve is provided in the first passageway and is moved to an open condition when a solenoid is energized.

27 Claims, 9 Drawing Sheets

GAS CONTROL ASSEMBLY

RELATED APPLICATIONS

This application is a continuation-in-part application of Ser. No. 10/361,328, filed Feb. 10, 2003 now abandoned.

BACKGROUND OF THE INVENTION

This invention relates to apparatus for controlling the flow of gas into and out of a cylinder or other type of vessels for pressurized gas.

U.S. Pat. No. 5,458,151 to Wass discloses a solenoid control valve mountable to the collar of a gas cylinder with the solenoid being in the interior of a cylinder for operating a valve for controlling the flow of pressurized gas from the cylinder. In U.S. Pat. No. 6,041,762 to Sirosh et al, there is disclosed controls for controlling the supply of gas from a gas vessel which includes a module having a pressure regulator in the interior of the vessel, pressure and temperature sensors, a pressure relief device, a solenoid valve and a check valve. Borland et al, U.S. Pat. No. 5,562,117, discloses a valve body threaded to the neck of a pressurized vessel, the valve body having a bore opening to the ambient atmosphere and to the interior of the vessel with a relief device being mounted the in bore. Further, the valve body has a second bore extending axially therethrough with a solenoid valve being mounted to the inner end portion of the valve body to extend within the vessel, In order to provide an improved assembly for controlling the flow of pressurized fluid into and out of a container for pressurized fluid, this invention has been made. The gas control assembly of this invention is mountable to the neck of a vessel containing pressurized gas or liquid and can be used, for example, for controlling the flow of fuel gas, including natural gas, to the engine of a motor vehicle, controlling the flow of gas to fuel cells, controlling the flow of gases such as oxygen, hydrogen, nitrogen for various industrial uses and controlling the flow of liquid for various industrial uses.

SUMMARY OF THE INVENTION

The gas control assembly includes a control body that in one embodiment has a valve body and an elongated housing threadedly mounted to the neck of a cylinder (vessel) for pressurized gas to extend into the interior of the cylinder and, at its inner end, to mount a relief device that blocks fluid flow from the interior of the cylinder into the housing bore until the temperature and/or pressure in the cylinder exceeds a preselected level. A fitting is threaded to the housing to extend into the housing bore and mounts a valve body external of the cylinder. The fitting and housing in combination mount an operable valve in the interior of the cylinder with there being a first fluid flow passageway through the relief device, the housing bore, the valve stem of the operable valve and the fitting to the ambient atmosphere. Further, there is a second fluid flow path from the cylinder interior and into the housing bore and through the fitting to a clearance space provided by the valve body and the fitting and therethrough to a main outlet, an operable valve being provided in the second passageway to control flow through the second passageway. A solenoid is mounted to the valve body and, upon being energized, moves its plunger to, through a rod, move the valve stem of the operable valve to its open position. There is also provided in the second fluid flow passageway, a manually operated valve and a pressure regulator that in part are defined by the valve body. Additionally, an inlet check valve is mounted to the valve body and opens to the second passageway to permit only the inflow of pressurized fluid into the second passageway, but permit not fluid flow in the opposite direction. In a second embodiment, the control body mounts the pressure and/or thermal relief valve exterior of the vessel and in fluid communication with the passageway that opens to the vessel interior and to the main pressure outlet. In the second embodiment, the relief valve opens to the passageway intermediate its opening to the vessel interior and the main valve which is disposed in the passageway.

An object of this invention is to provide a new and novel assembly for controlling the flow of pressurized fluid from the interior of a cylinder (vessel) containing fluid under high pressure. In furtherance of the above object, it is another object of this invention to provide the assembly with two separate fluid flow passageways, one passageway with a relief device opening thereto and that permits fluid flow therethrough in the event the pressure and/or temperature in the cylinder exceeds a preselected level and the other having a pressure regulator therein that is operable to allow fluid under pressure to flow to the main outlet when the pressure at the outlet is below the desired level. A different object of this invention is to provide a new and novel control assembly that includes a control body with a fluid passageway having an inlet that opens to the interior of a vessel to which it is mounted and to a main outlet with a main valve between the inlet and the outlet and the control body mounting a pressure regulator in the passageway between the main valve and the outlet and a thermal relief device exterior of the vessel and opening to the passageway between the inlet and the main valve.

DESCRIPTION OF THE PREFERRED EMBODIMENTS

Referring to FIGS. 1–6 of the drawings, the gas control assembly of the first embodiment of this invention includes a control body G that includes a valve body V which forms the control body outer end portion that is located exterior of the vessel 12 and a valve subassembly, generally designated 10. The valve subassembly has a fitting F and an axially elongated housing H. The housing and part of the fitting form the control body inner end portion which extends within a vessel (cylinder) 12 for gas under high pressure. The housing upper end portion 11 has external threads for being threadedly mounted to the internally threaded port (neck) portion 12A of the vessel 12. A bore B extends axially through the housing, the upper end portion of the housing having an internally threaded portion for having an axial intermediate portion 14 of the fitting F threaded thereto to extend within the housing bore and axially outwardly of the housing and the neck portion of the vessel.

Figure 1:
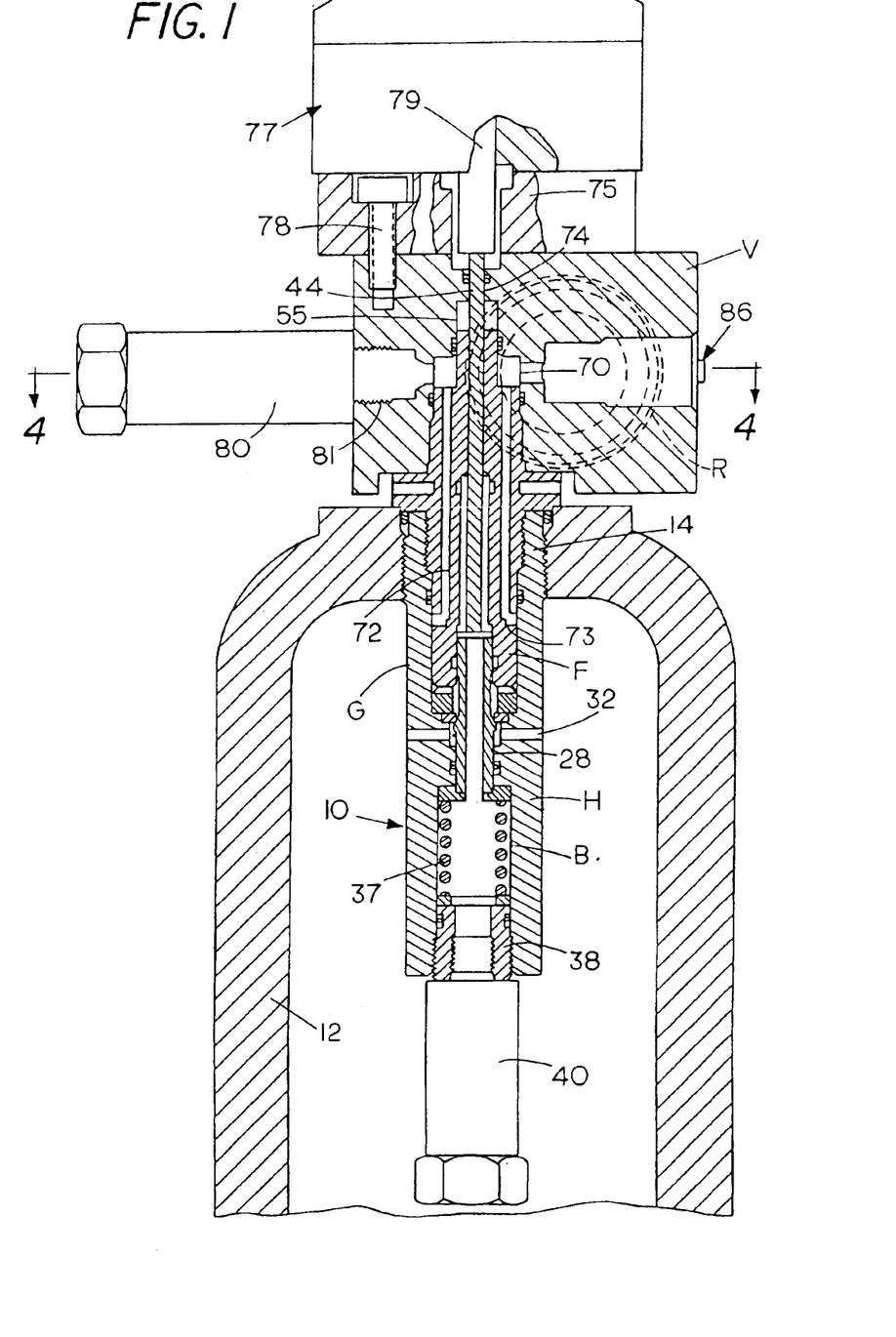
FIG. 1 is a longitudinal view of the gas control assembly of the first embodiment of the invention with parts thereof being shown in cross section and only part of the gas cylinder being shown; said view being generally taken along the line and in the direction of the arrows 1—1 of FIG. 5.
Figure 2:
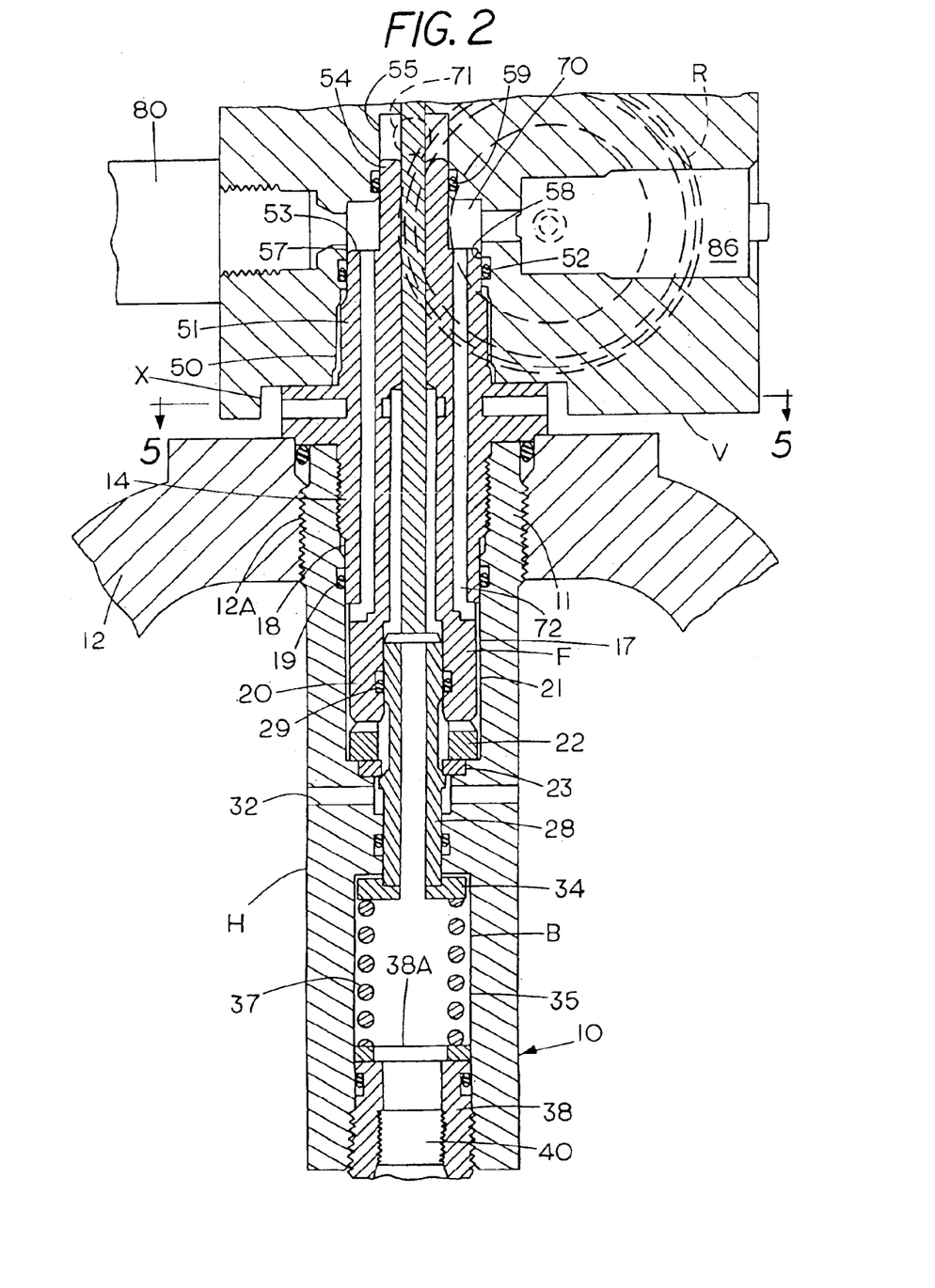
FIG. 2 is an enlarged showing of a fragmentary portion of the apparatus shown in FIG. 1.

Just below the mating threaded portions of the housing and fitting, the housing and fitting having reduced diameter portions with an O-ring 19 mounted by the housing reduced diameter bore portion 17 to form a fluid seal between the housing wall of bore portion 17 and the radial adjacent portion of the fitting. Below the fluid seal 19, the fitting lower end portion 20 is of a further reduced outer diameter to provide an annular clearance space 21 with the housing. The bottom of the fitting abuts against a valve seat mount 22 and the mount in turn is in abutting relationship to the valve seat 23 to retain the seat in abutting relationship to the annular shoulder 26 of the bore B, the valve seat forming a part of a main valve M.

Figure 3:
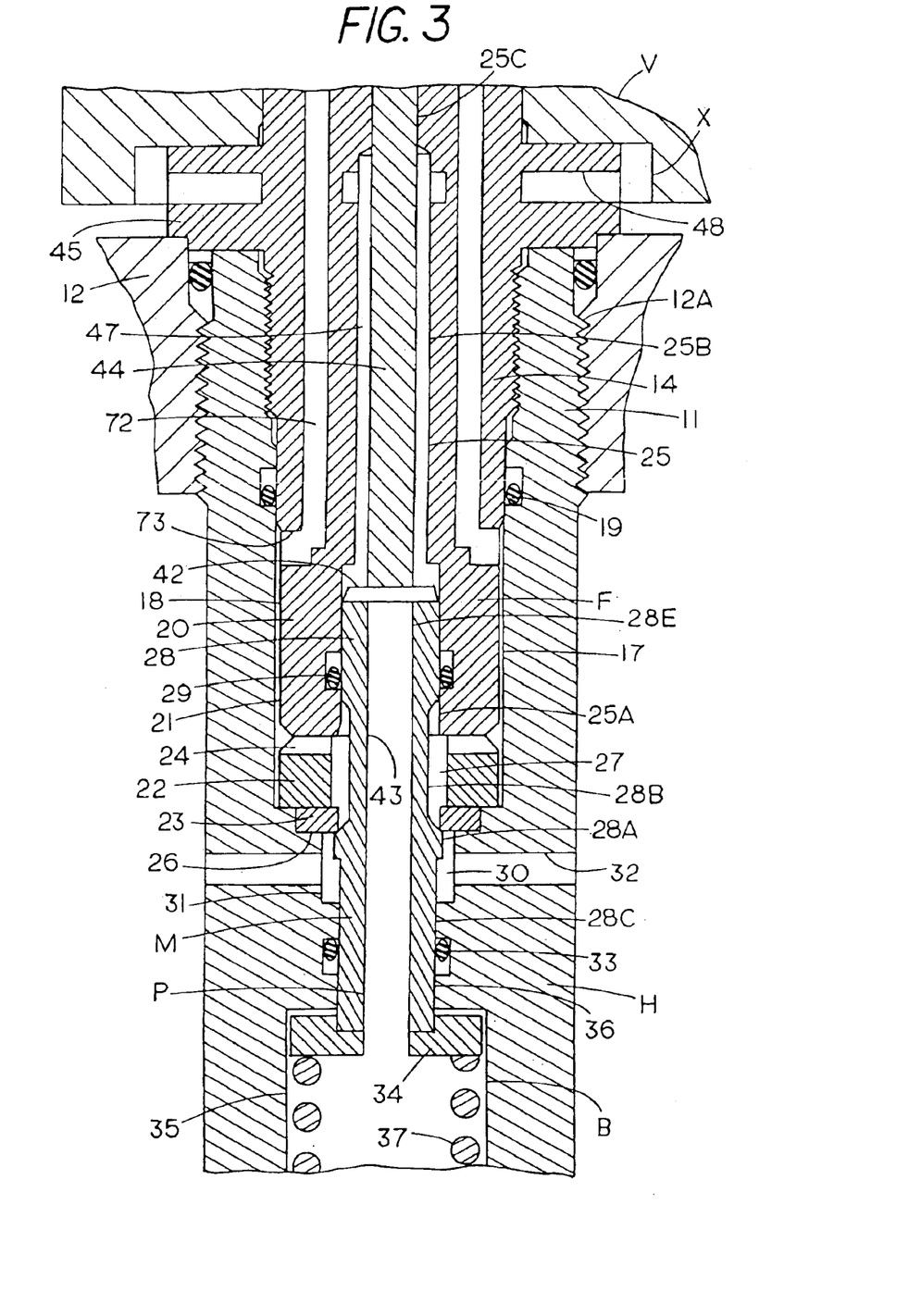
FIG. 3 is a further enlarged showing of a fragmentary portion of the apparatus of FIG. 1.

The fitting has a main bore 25 extending axially therethrough, the lower end portion 25A of the bore having the upper end portion 28E of the annular valve stem 28 of the main valve M axially slidably extended therein with an O-ring 29 mounted by the fitting to form a fluid seal with the valve stem. The valve stem has a reduced diameter portion 28B that is of a smaller outer diameter than the inner diameter of the valve seat to extend axially through the valve seat 23 and has an axial intermediate enlarged diametric portion 28A to form a fluid seal with the valve seat when abutting thereagainst to block axial fluid flow through the valve seat. The housing bore has a bore portion 31 of a larger diameter than each of the inner diameters of the valve seat and the enlarged diametric portion 28A to, in conjunction with the valve stem, provide an annular clearance space 30. The axial intermediate portion of the housing has cross bores (passageway inlet) 32 opening to housing bore portion 31 and through the housing radial exterior surface to the interior of the vessel. When the valve stem is in its open position, fluid can flow through the valve seat to the annular clearance space 27 between the valve seat mount and the axial intermediate, reduced outer diameter portion 28B of the valve stem and therefrom to the radial slots 24 in the seat mount to the annular clearance space 21. The stem portion 27B is axially elongated, extends between stem portions 28A, 28E and for the major part of its axial length is of a smaller outer diameter than each of portions 28A, 28E.

The minimum diameter portion 36 of the housing bore opens axially to bore portion 31 and mounts an O-ring 33 to have the lower end portion 28C of the valve stem slidably extended therethrough in fluid sealing relationship therewith. The lower end of the valve stem abuts against an annular spring retainer 34 that is in the lower end portion 35 of the housing bore. A coil spring 37 abuts against the spring retainer and an annular member 38A which in turn abuts against a boss 38, or the spring may directly abut against the boss. The boss is threaded in the inner end of the housing bore whereby the spring resiliently retains the valve stem in abutting relationship to the valve seat for blocking fluid flow therethrough.

A conventional pressure and/or temperature relief device 40 is threadedly mounted by the boss to, upon either one or both of the pressure and temperature in the vessel exceeding a predetermined level, allow fluid (gas) in the vessel to flow from the interior of the vessel and therethrough and through the boss into bore portion 35 and exhaust to the ambient atmosphere through cross bores 48.

The upper end of the valve stem has a slot 42 extending diametrically thereacross and has the valve stem bore 43 opening thereto and through the lower end of the valve stem to the central bore of the spring retainer.

The fitting main bore 25 has an axial intermediate bore portion 25B that at its lower end opens to bore portion 25A to provide an annular shoulder above the upper end of the valve stem when it is in its valve closed position, and at its upper end to the fitting reduced diameter bore portion 25C. Mounted in the fitting bore 25 is a rod 44 that has its lower end in abuttable relationship to the upper end of the valve stem and its upper end extending above the fitting. The rod is of a diameter to form a close axially slidable fit with fitting bore portion 25C and to form an annular clearance space 47 with bore portion 25B.

The fitting axial intermediate portion 45 is of a larger cross sectional area than the vessel port (inner diameter of the neck) and may be, for example, of a hexagonal shape in transverse cross section. The fitting portion 45 has a cross bore 48 extending transversely thereacross and fluidly connecting the clearance space 47 to the ambient atmosphere. Thus, when the pressure and/or temperature in the vessel interior exceeds a predetermined level, pressurized fluid in the vessel flows through the relief device and a fluid passage P provided by the boss 38, the part of bore portion 35 between the boss and the spring retainer, the valve stem bore 43, the slot 42, the annular clearance space 47 and the cross bore 48 to the ambient atmosphere.

The gas control assembly also includes a valve body V threadedly mounted to the upper end portion of the valve subassembly. That is, the valve body V has a bore X extending axially therethrough with an axial intermediate portion 50 of the valve body bore being threadedly mounted to the upper end portion 51 of the fitting, the lower end of bore X being of a sufficiently greater diameter than fitting portion 45 to permit threading rotation of the valve body relative to the fitting. The central axes of the valve body bore and the fitting bore 25 are axially aligned. Above the threaded portions of the valve body bore and the fitting, the valve body bore and the fitting are of further reduced diameters 57, 58 respectively with an O-ring 52 providing a fluid seal therebetween. Above the fitting portion 58, the fitting has a still further reduced diameter top end bore portion 54 to form an annular shoulder 53 with fitting portion 57. In axially spaced relationship above the annular shoulder, the fitting top end portion 54 extends into a valve body further reduced diameter bore portion 55 with an O-ring 59 providing a fluid seal therebetween. With the above, there is provided an annular main chamber (clearance space) 70 surrounding the fitting portion 54. A vent aperture 71 opens to the valve body bore portion 55 above the fitting.

The valve body main bore has a minimum diameter portion 74 that opens to bore portion 55 and to the main bore top end portion 75 which opens through the top surface of the valve body. The minimum diameter bore portion 74 forms a close fit with rod 44 which is axially movable therein and extends through an O-ring that forms a fluid seal between the rod and bore portion 74. The rod 44 extends into bore portion 75 in both the open and closed positions of the valve stem.

A linear solenoid, generally designated 77, has its housing attached to the valve body V by cap screws 78, the solenoid having a solenoid coil 75 exterior of the vessel and a plunger 79 in abuttable relationship to the top end of the rod 44. When the solenoid coil 75 is energized, the plunger forces the rod 44 to extend to force the valve stem 28 to move to its valve open position. When the solenoid is deenergized, the spring 37 acting through the spring retainer forces the valve stem to its valve stem closed position. Thus, when there is any interruption of power to the solenoid, the valve stem is resiliently moved to block fluid flow through the valve seat 23. With reference thereto, it is to be noted, the rod 44 is abuttable against each of the plunger and valve stem and is not attached to either one of them.

A conventional inlet check valve 80 is threaded into a valve body bore 81 which opens to the clearance space 70 to permit pressurized fluid flowing through the check valve and to the clearance space and thence through axial fitting passages 72 to cross bores 73 that open to the clearance space 21 but does not permit fluid in the clearance space exhausting to the ambient atmosphere. When the solenoid is energized to move the valve stem 28 to its open position and pressurized fluid is being applied through the check valve from a conventional source of pressurized fluid (not shown), the pressurized fluid in the clearance space 21 flows through the slot 24 to the fitting main bore, through the valve seat to the annular clearance space 30 and therefrom, flows to and through the cross bores 32 to flow into the interior of the vessel 12. Upon the pressure in the vessel increasing sufficiently high relative to the inlet pressure and/or the discontinuance of applying pressurized fluid at the check valve, the solenoid is deenergized and the valve stem resiliently moves to its closed position.

Also opening to the clearance space 70 is the reduced diameter portion of a bore 83 in the valve body. The valve stem mount 82 of a manually operated on-off valve, generally 86, is threaded in bore 83. Valve 86 includes a valve stem 84 threaded therein and has an enlarged diametric portion for, in a closed position, abutting against a valve seat 85 to block fluid flow from the clearance space 70, through cross slots between the valve seat and the stem mount and to the annular clearance space 87 defined by the wall of bore 83, the stem mount and valve seat. When the valve stem 84 is threaded to its open position, it permits fluid flow from the clearance space 70 to the clearance space 87.

Figure 4:
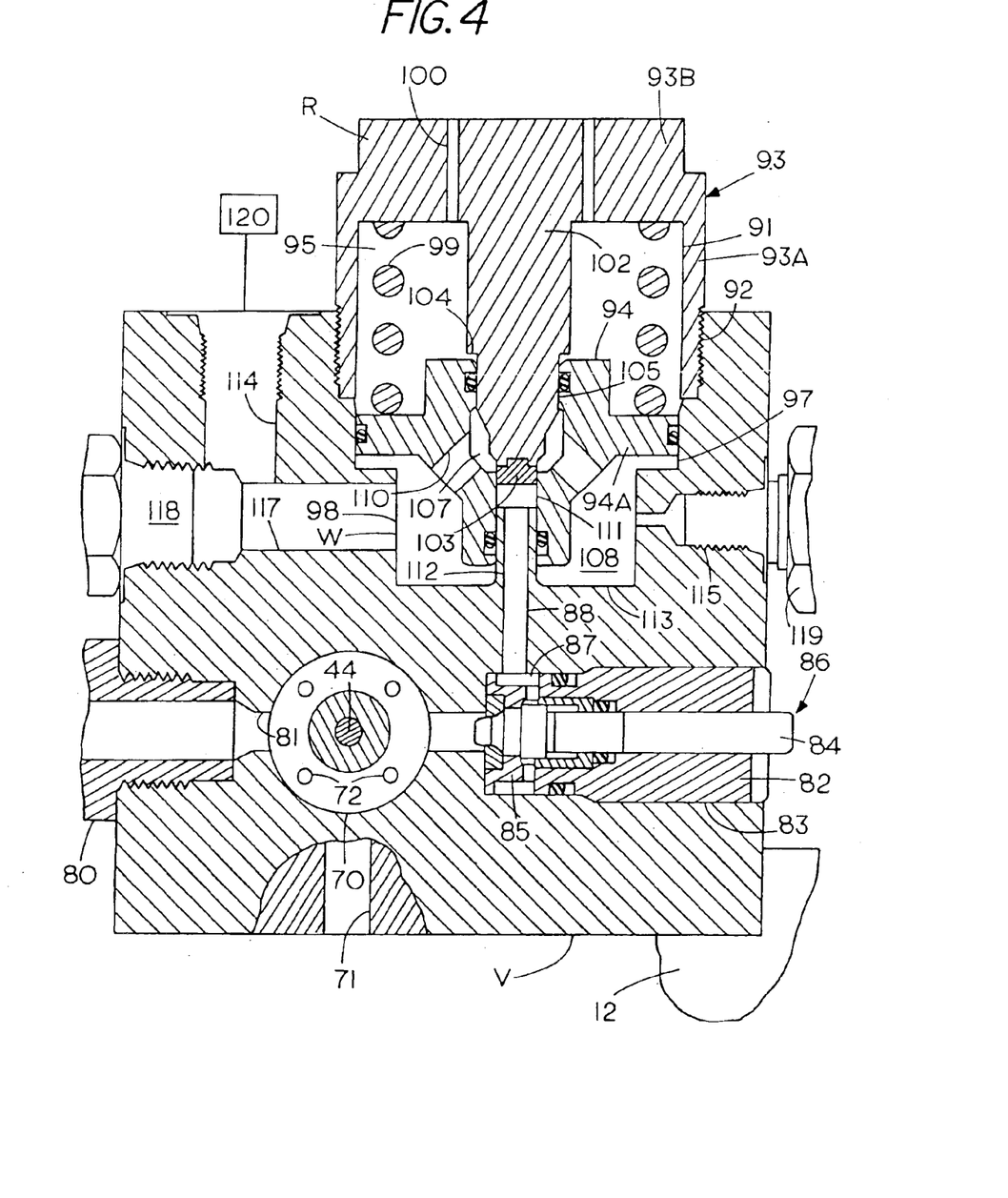
FIG. 4 is a transverse cross sectional view that in part is generally taken along the line and in the direction of arrow 4—4 of FIG. 1 and in part at a different elevation.
Figure 5:
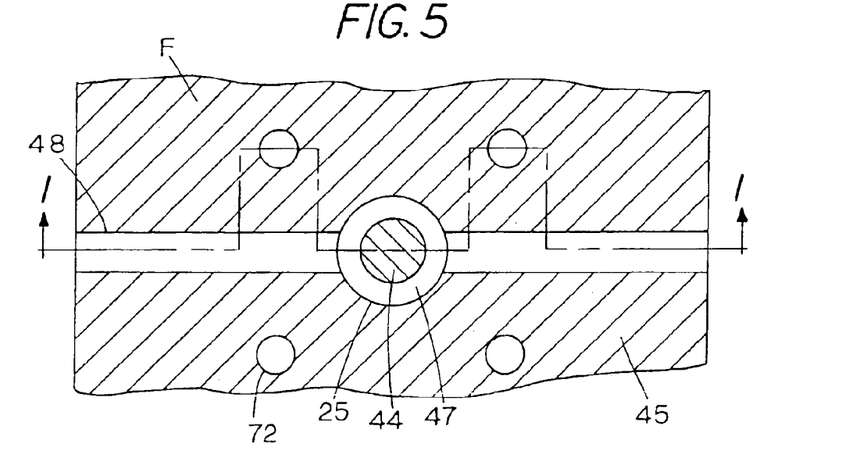
FIG. 5 is a fragmentary transverse cross sectional view of the fitting that is generally taken along the line and in the direction of the arrows 5—5 of FIG. 2.
Figure 6:
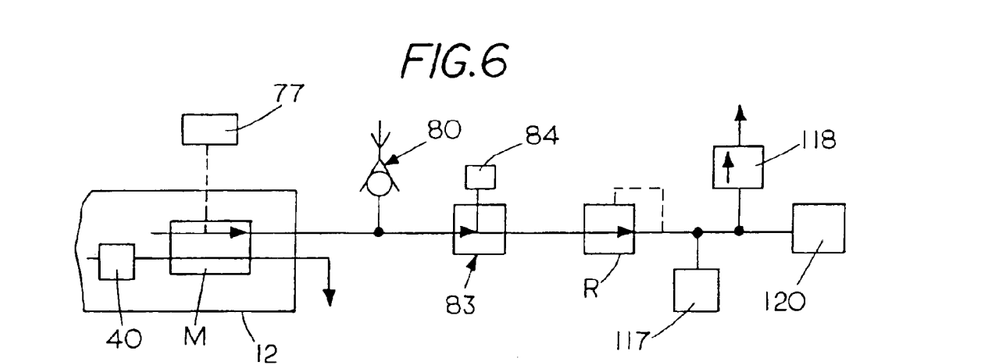
FIG. 6 is a diagrammatic showing of control components of the assembly of the first embodiment.

The valve body has a pressure regulator bore W of varying diameters with the outer largest diameter bore portion 92 having an annular portion 93A of a cap, generally designated 93, of the pressure regulator R threaded therein. The regulator includes a piston 94 having an enlarged diametric portion 94A axially movable in the annular cap recess 95 and the body bore portion 97 which opens to bore portion 92 and is of a smaller diameter than bore portion 92. The piston portion 94A mounts an O-ring in fluid sealing relationship with the radial adjacent part of the cap annular portion and the wall defining bore portion 97 respectively when axially adjacent thereto. Bore portion 97 opens to a further reduced diameter bore portion 98 to form a shoulder to limit the axial movement of the piston away from the cap while a coil spring 99 extending within the recess and abutting against the piston enlarged diametric portion resiliently urges the piston away from the cap. The cap has vent holes 100 opening to the recess 95, The cap includes an axially elongated valve stem 102 that in part with the cap annular portion 93A and together with the inner surface of the cap end portion 93B defines the cap recess. The valve stem extends further away from the end portion 93B than the cap annular end portion. The end part of the valve stem remote from the cap end portion mounts a valve seat 103. The valve stem has an annular shoulder 104 axially intermediate its opposite ends to limit the axial movement of the piston toward the cap end portion, provided the valve seat 103 in abutting against the part of the piston at the opening of the reduced diameter bore portion 111 to a clearance space 107, has not already limited the movement of the piston in the same direction.

The piston has a central bore extending axially therethrough, the piston bore having a bore portion 105 at one axial end to have an intermediate diameter part of the valve stem extending therein with the piston mounting an O-ring in fluid sealing relationship with the valve stem. In a piston closed position, on the axially opposite side of bore portion 105 from the piston upper end, the piston bore is of a larger diameter while the valve stem is of further reduced diameters to form the annular clearance space 107. In an axial direction away from the valve stem shoulder 104 and toward the valve seat, the piston is of reduced outer diameters from the piston enlarged diametric portion to, in combination with the wall defining bore portion 98, provide a control chamber (relatively large annular clearance space) 108. The valve stem has a plurality of apertures 110 for fluidly connecting the clearance spaces 107, 108 regardless of whether the piston is in its open position or in its closed position.

The piston bore has a reduced diameter end portion 111 axially opposite the cap, the opening of the bore portion 111 to the clearance space 107 being of a diameter that when the valve seat 103 abuts thereagainst, the piston is in its closed position to block fluid flow from bore portion 111 to the clearance space 107, and when axially spaced therefrom, the piston is in its open position. The valve body (control body) V has a central sleeve (tubular) portion 112 extending toward the cap in a direction away from end wall 113 which in part defines the axial end of bore portion 98 that is remote from the cap. The sleeve is coaxial with the valve stem 102 and axially spaced therefrom. The piston mounts an O-ring to provide an axially slidable fluid seal between the piston and the sleeve. The bore 88 extends axially through the sleeve to open to the bore portion 111.

When the pressure in the control chamber 108 drops below a preselected level, the spring 99 moves the piston away from the cap end 93B to the piston open position. By selecting the spring 99 having the desired spring characteristics, the desired level of output pressure can be controlled and if it is desired to change the outlet pressure, a spring having different spring characteristics can be used. Thus, the desired reduction of pressure from that in bore portion 111 to that in the control chamber can be obtained.

The valve body has a bore 115 for having a conventional pressure sensor 119 threaded therein. The bore 115 opens to the control chamber 108 whereby the pressure in said chamber can be sensed. Also opening to the control chamber 108 is a bore 117, the outlet end of bore 117 threadedly mounting an outlet relief valve 118 that permits fluid in the control chamber exhausting to the ambient atmosphere in the event the pressure in the control chamber exceeds a preselected value. An outlet bore (main outlet) 114 opens to bore 117 and is threaded to have a suitable outlet connector 120 connected thereto for connection to the mechanism (not shown), for example the engine of a vehicle or other apparatus, that utilizes the fluid from the vessel. Accordingly, there is provided a passageway from the vessel interior to the outlet connector which includes cross bores 32 opening through the housing radially outer peripheral surface to the vessel interior and to the clearance space 30, through the valve seat 23 to the clearance space 27 when the valve member 28 is in its opened position, thence through slots 24 to space 21 and successively thereafter through cross bores 73, axial passages 72 in the fitting, space 70, bore 83, the manual valve 86 when open, bore 88, control chamber 108 when the piston 94 is in its open position, bore 117 and bore (main outlet) 114 which opens to the outlet connector 120 and to the ambient atmosphere when no outlet connector is connected thereto. Thus, the last mentioned passageway has the manual valve 86 and the pressure regulator therein which permit fluid flow therethrough when the valve stems 28 and 84 are in their open positions and the piston 94 is in its open position.

Referring to FIGS. 7–10 the second embodiment of the gas control assembly of this invention has a control body, generally designated 125, that includes a fitting, generally designated 132. The control body has an axial inner end portion that includes an axially elongated, reduced outer diameter, annular lower portion 126 with an externally threaded portion 127 that extends within and is threadedly mounted to the vessel neck portion 12A. The control body has a bore E extending axially through portion 126 to open to the interior of the vessel. The lower part of the control body bore E is threaded at 135 while thereabove, it has a bore portion 129 of an axial length to extend above the vessel neck portion. Bore portion 129 opens to a reduced diameter portion 130 to form an annular shoulder against which a valve seat 131 is retained in abutting relationship by the top of the fitting which is mounted in the bore E. Bore portion 130 opens to a further reduced diameter bore portion 134 which in turn opens to a still further reduced diameter bore portion 137. Bore portion 137 opens to the top portion 138 of the control body bore E.

Figure 7:
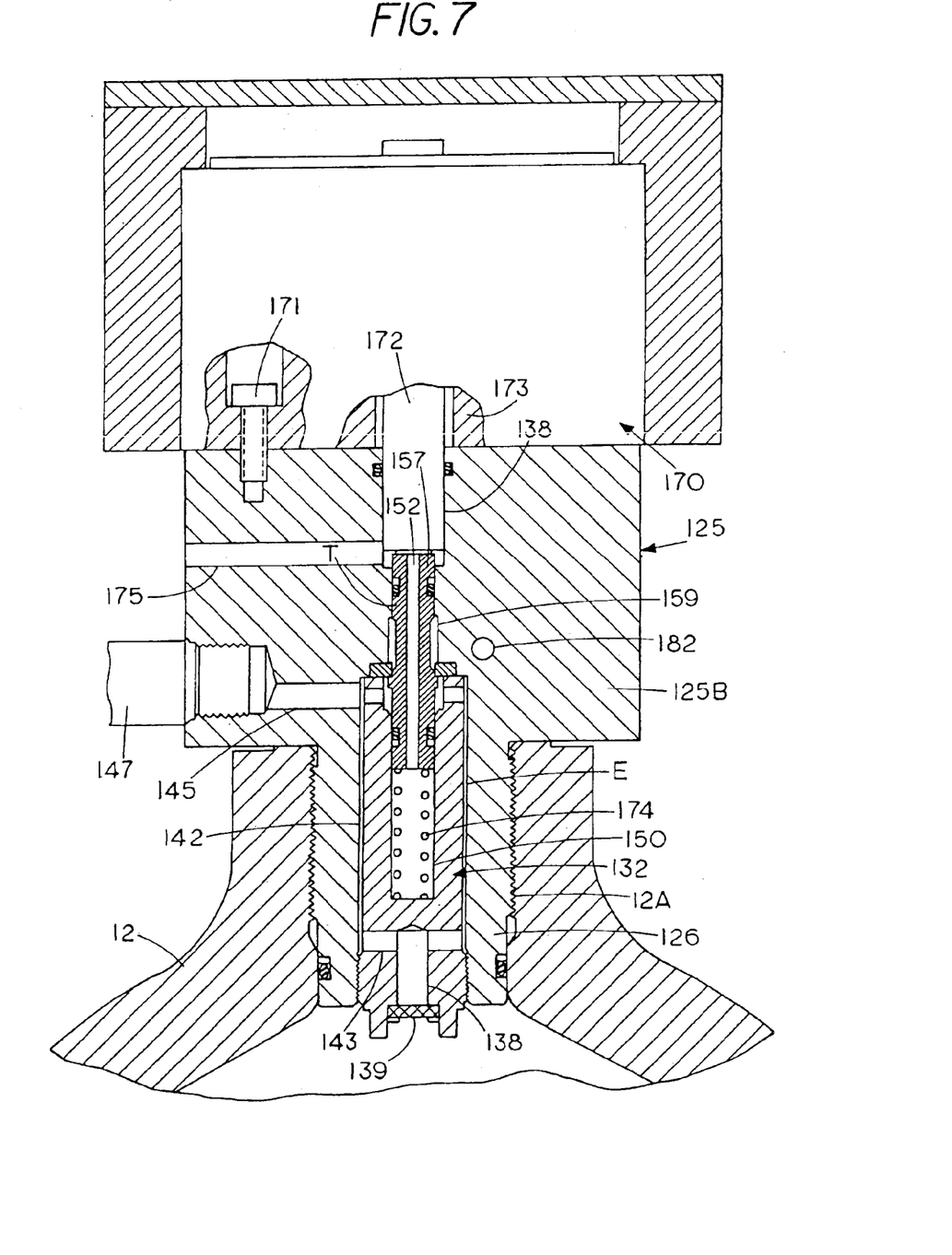
FIG. 7 is a longitudinal view of the gas control assembly of the second embodiment of the invention with parts thereof being shown in cross section and only part of the gas cylinder being shown; said view being generally taken along the line and in the direction of the arrows 7—7 of FIG. 10.
Figure 8:
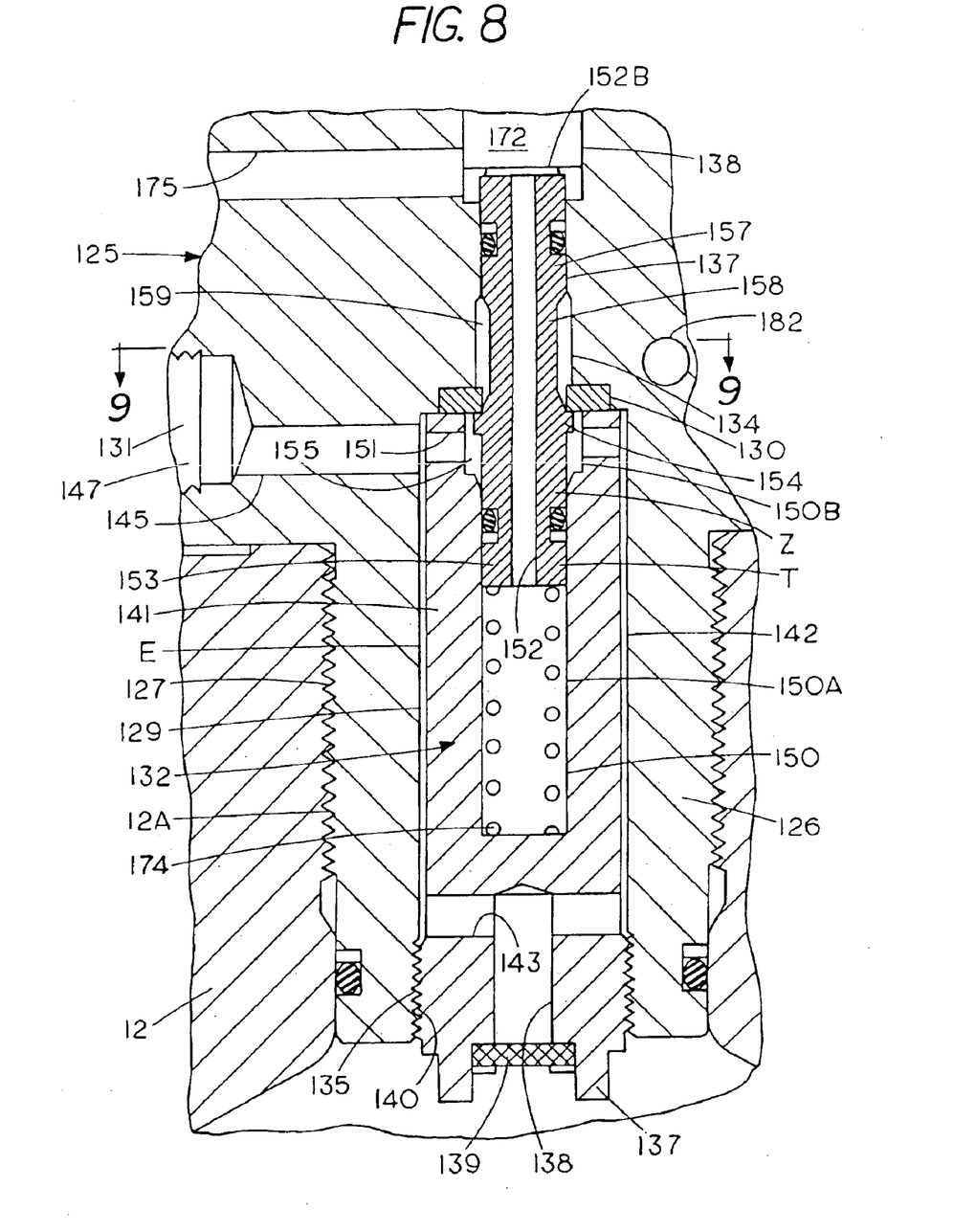
FIG. 8 is an enlarged showing of a fragmentary portion of the apparatus shown in FIG. 7.

The bottom end of the body portion 126 is internally threaded at 135 to have the lower threaded part 140 of the fitting threaded thereto to extend upwardly in the bore E. The fitting has a bottom annular flange (inlet) 137 which opens to the fitting central axial bore 138 to in conjunction therewith provide a shoulder against which a filter 139 is mounted in abutting relationship therewith. Above the fitting threaded portion 140 the fitting axially elongated portion 141 is of a reduced diameter to in conjunction with the radially adjacent part of the control body portion that constitutes part of bore E forms an annular clearance space 142 that extends to the top of the fitting. The lower end of the clearance space is placed in fluid communication with the vessel interior through cross bores 143, axial bore 138 and the filter to the part of the opening of flange 137 that opens to the vessel interior.

The top end portion of the annular clearance space 142 opens through a passage 145 in the control body outer end portion 125B to a conventional pressure and/or temperature relief device 147 which is threadedly mounted to the control body to, upon either one or both of the pressure and temperature in the vessel, or the temperature adjacent to the device exceeding a predetermined level, allow fluid (gas) in the vessel to flow from the interior of the vessel, through the annular clearance space 142, the passage 145 and through the device 147 to vent to the ambient atmosphere. With reference thereto, the device is mounted to the control body above the top of the vessel.

The fitting has a valve bore 150 that includes a lower end portion 150A with its bottom above the cross bores 143, but not opening to the cross bores, and opens through the top of the fitting to a slightly larger diameter top bore portion 150B which in turn opens to the valve seat opening. The bore portion 150B is in fluid communication with the clearance space 142 through fitting cross bores 151. A valve stem T extends axially through the valve seat and has its lower end portion 153 extending within the fitting bore portion 150A. The lower end portion 153 is of a diameter to form a close sliding fit within the fitting bore portion 150A with an O-ring being provided between the stem portion 153 and the fitting. The valve stem also has an axial intermediate enlarged diametric portion 154 to form a fluid seal with the valve seat when abutting thereagainst to block axial fluid flow through the valve seat. The fitting bore portion 150B is of a larger diameter than each of the inner diameters of the valve seat and the enlarged diametric portion 154 to, in conjunction with the valve stem, provide an annular clearance space 155 below the valve seat.

Joined to the stem enlarged diametric portion is an axially elongated stem reduced diameter portion 158 that, in conjunction with the body wall defining bore portion 134, provides an annular clearance space 159 that extends axially between the valve seat and body bore portion 137. The valve stem reduced diameter portion for at least a major portion of its length is of a smaller outer diameter than each of stem portions 153, 157 and is smaller than the inner diameter of the valve seat and extends through the valve seat. The upper end of the stem reduced diameter portion is joined to the stem upper (top) end portion 157 which is of the same outer diameter as that of the stem lower end portion. An O-ring is provided between the upper end portion and the control body bore defining bore portion 137. The valve stem has a bore 152 extending axially therethrough to open to the bore portion 150A below the valve stem and at the top end through a cross slot 152B to the annular clearance space between the valve stem and the wall defining the bore portion 138. A passage 175 places the last mentioned clearance space in fluid communication with the ambient atmosphere. Thus, the valve stem T and valve seat 131 provide a second embodiment main valve arrangement Z which is a balanced valve arrangement.

A linear solenoid, generally designated 170, is attached to the upper end portion of the control body by cap screws 171, the solenoid having a solenoid coil 173 exterior of the vessel and a plunger 172 extending within body bore portion 138, which opens downwardly to bore portion 137, in abuttable relationship to the top end of the valve stem. When the solenoid 170 is energized, the plunger forces the valve stem (valve member) T to move to its valve open position. When the solenoid is deenergized, the coil spring 174 forces the valve stem to move to its valve stem (valve) closed position, the spring being in the fitting bore 150 and abutting against the bottom of bore 150 and the bottom of the valve stem. Thus, when there is any interruption of power to the solenoid, the valve stem is resiliently moved to block fluid flow through the valve seat 131. The vent passage 175 opens to the ambient atmosphere and to the bore portion 138 adjacent to the adjacent ends of the valve stem and the plunger.

A conventional inlet check valve 182 is threaded into a control body bore 179 which opens to the clearance space 159 to permit pressurized fluid flowing through the check valve and to the clearance space 159 which is in the control body outer end portion. When the solenoid is energized to move the valve stem T to its open position and pressurized fluid is being applied through the check valve from a conventional source of pressurized fluid (not shown), the pressurized fluid in the clearance space 159 flows through the valve seat to the annular clearance space 155 and therefrom, flows to and through the cross bores 151, annular clearance space 142, cross bores 143, bore 138 and through the filter to flow into the interior of the vessel 12. Upon the pressure in the vessel increasing sufficiently high relative to the inlet pressure and/or the discontinuance of applying pressurized fluid at the check valve, the solenoid is deenergized and the valve stem resiliently moves to its closed position.

Also opening to the clearance space 159 is a control body bore 178 for having a conventional outlet sensor 177 threaded therein to sense the pressure in the clearance space, the outlet sensor 177 thus being mounted to the control body outer end portion. A manually operated on-off valve, generally designated 180, that advantageously is of the same construction as valve 86, is threaded in a bore 181 in the control body, bore 181 opening through passage 179 to the clearance space 159. Valve 180 includes a valve stem 180A that has an enlarged diametric portion for, in a closed position, abutting against a valve seat 180B to block fluid from bore 181 to bore 186, but when open, permits fluid flow between said bores. The valves 186 and 180 are mounted to the control body outer end portion.

Figure 9:
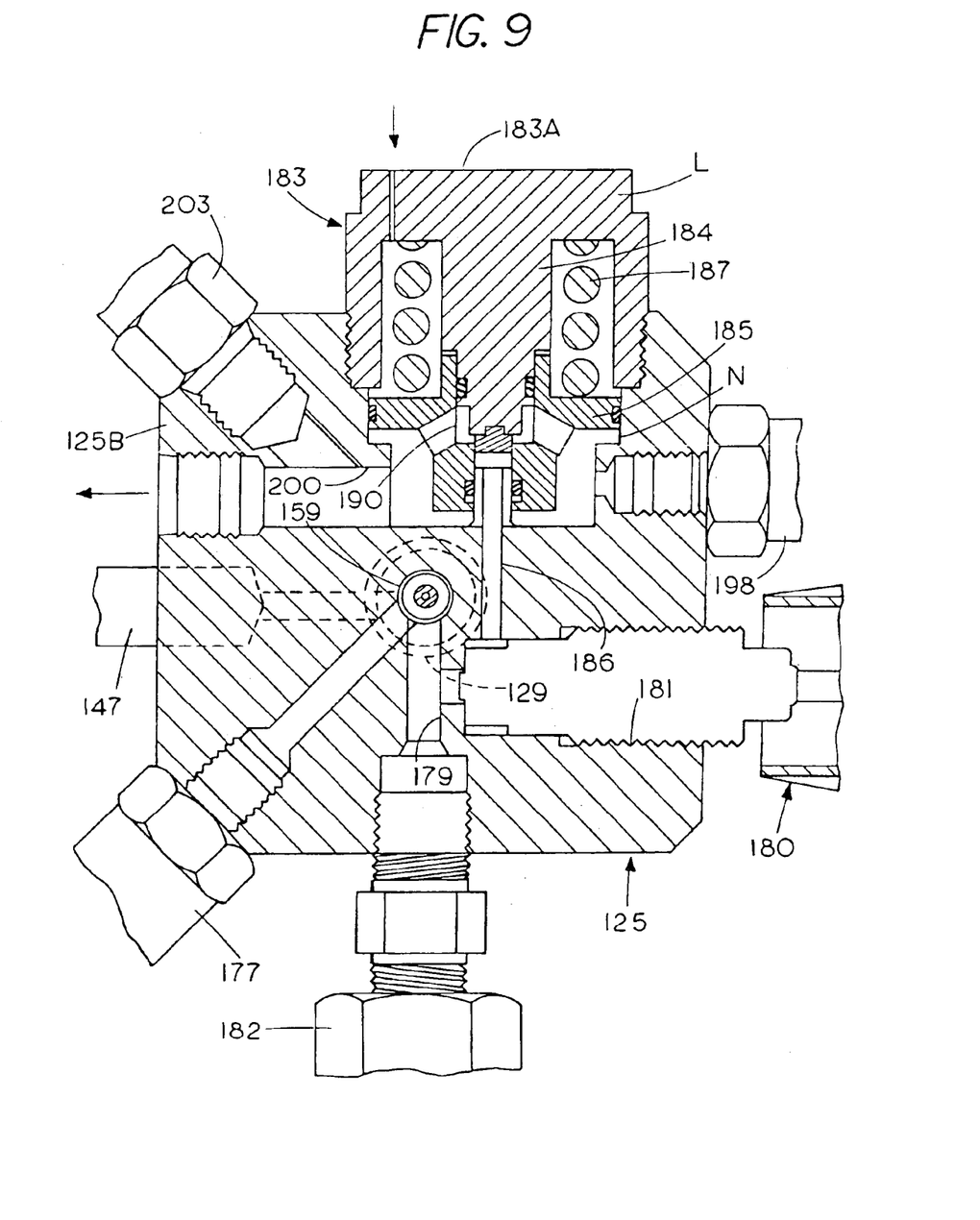
FIG. 9 is a transverse cross sectional view that in part is generally taken along the line and in the direction of arrow 9—9 of FIG. 8.
Figure 10:
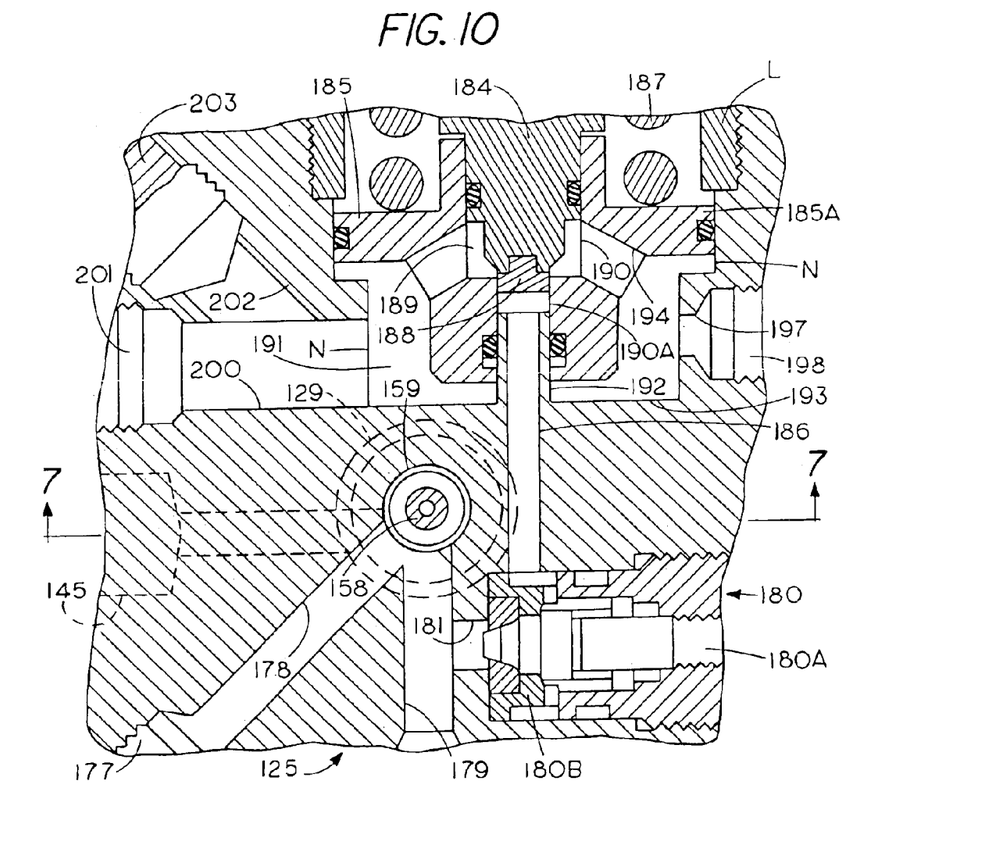
FIG. 10 is an enlarged fragmentary view of a portion of FIG. 9.

The outer end portion of the control body has a pressure regulator bore N with a pressure regulator L threaded therein. Other than for minor differences in the shape of the valve stem 184 of the cap, generally designated 183, and the part of the piston 185 adjacent to the cap, the intermediate part of the valve stem 184 mounting an O-ring in fluid sealing engagement with the piston instead of the piston mounting such an O-ring, the shape of the regulator bore and the construction of the regulator L may be substantially the same as bore W and regulator R of the first embodiment and function in the same manner. Thus, the regulator L and bore N will be only briefly described.

The regulator L includes a piston 185 having a bore 190 extending axially therethrough and is axially movable in the bore N. The regulator also includes a coil spring 187 abutting against the cap and the piston enlarged diametric portion 185A to resiliently urge it to an open condition wherein the valve seat 188 is out of abutting relationship with the part of the piston at the opening of the reduced diameter piston bore portion 190A to the clearance space 189 in the clearance space between the piston and the inner end portion of the valve stem 184. The valve seat is mounted to the inner end of the valve stem 184 which extends within the bore 190 of the piston. The control body has a central sleeve (tubular) portion 192 extending within the inner part of the piston bore (part remote from the cap) 190 and toward the cap and the valve seat, i.e. in a direction away from end wall 193 that in part defines the axial inner end of the regulator bore N which is remote from the cap. The bore 186 opens through the sleeve to the piston bore portion 190A. The valve stem and bore N have shoulders similar to that of the first embodiment for limiting the movement of the piston 185 in its closing and opening directions respectively.

Apertures 194 in the piston place the clearance space 189 in fluid communication with the control chamber 191 that extends between the piston enlarged diametric portion 185A and the end wall 193. The outer end portion of the control body has a bore 197 for having a conventional pressure sensor 198 threaded therein. The bore 197 opens to the control chamber 191 whereby the pressure in said chamber can be sensed by the outlet sensor 198. Also opening to the control chamber 191 is a bore 200 (control body outer end portion main outlet) that is threaded to have a suitable outlet connector 201 connected thereto for connection to the mechanism (not shown), for example the engine of a vehicle or other apparatus that utilizes the fluid from the vessel. A bore 202 opens bore 200, the outlet end of bore 202 threadedly mounts an outlet relief valve 203 which permits fluid in the control chamber exhausting to the ambient atmosphere in the event the pressure in the control chamber 191 exceeds a preselected value.

Accordingly, the second embodiment is provided with a passageway from the vessel interior to the outlet connector 201 which includes bore 138 which opens through the filter to the vessel interior, cross bores 143 opening through the fitting radially outer peripheral surface to the clearance space 142, through cross bores 151 to clearance space 155, through the valve seat 131 to the clearance space 159 when the valve member T is in its opened position, thence successively thereafter through bore 179, bore 181, the manual valve 180 when open, bore 186, bore portion 190A, clearance space 189 and apertures 194 when the piston 184 is in its open position, control chamber 191 and bore (main outlet) 200 which opens to the outlet connector 201 and opens to the ambient atmosphere when no outlet connector is mounted thereto. Thus, the last mentioned passageway has the manual valve 180 and the pressure regulator L therein which permit fluid flow therethrough when the valve stems T and 180A are in their open positions and the piston 185 is in its open position as a result of the pressure in the control chamber being below the preselected level.

With each of the embodiments, when the pressure in the control chamber 108, 191 drops below a preselected level, the spring 99, 187 moves the piston 94, 185 away from the cap end 108, 183A to the piston open position. By selecting the spring 99, 187 having the desired spring characteristics, the desired level of output pressure can be controlled and if it is desired to change the outlet pressure, a spring having different spring characteristics can be used. Thus, the desired reduction of pressure from that in bore portion 111, 190A to that in the control chamber can be obtained. With the manual on-off valve being in the passageway between the pressure regulator and the main valve, the on-off valve can be turned to an off position to facilitate the replacement of the pressure regulator spring.

In each of the embodiments, the outer diameter of upper portions 28E, 157 and lower portions 28C, 153 of the valve stems is substantially the same and slightly smaller than the inner diameter of the respective valve seat. Further, in each of the embodiments, one end portion of the valve stem is surrounded by an annular clearance space and radially spaced therefrom while both of the end portions of the valve stem of each of the embodiments is in fluid sealing relationship with the control body.

What is claimed is:

1. A gas control assembly mountable to me threaded neck of a vessel containing fluid under pressure and extendable into the neck interior, comprising a control body having an axially elongated inner end portion that has threads for being threadedly mountable to the neck and extendable into the vessel interior and a control body outer end portion locatable exterior of the vessel when the threaded portion is threaded to the neck, a first fluid flow passageway extending within each of the assembly outer end and inner end portions and having an inlet in the interior of the vessel and a main outlet opening to the ambient atmosphere when the threaded portion is threaded to the neck, a main valve in the first passageway and operable between an open position permitting fluid flow through the passageway and a closed position blocking fluid flow through the passageway, said main valve including a valve seat in said passageway, a valve stem movable between a main valve open position and a main valve closed position, said valve stem extending through the valve seat and having an enlarged diametric portion abuttable against the valve seat to block fluid therethrough when in a valve stem closed position, means for operating the valve stem to its open position, said means including a solenoid mounted to the control body outer end portion remote from the assembly inner end portion and having a solenoid coil and plunger means movable to an extended position upon the coil being energized for operating the main valve to its open position, a manually operated on-off valve in the passageway between the main valve and the main outlet opening to permit blocking fluid flow through the passageway and a pressure regulator incorporated in the passageway intermediate the main valve and the passageway main outlet for controlling the pressure at the main outlet.

2. The gas control assembly of claim 1 wherein a relief device is mounted to control body outer end portion and opens to said passageway intermediate the valve seat and the inlet for permitting the exhausting of high pressure fluid therethrough upon being subjected to at least one of a pressure and a temperature exceeding a preselected level.

3. The gas control assembly of claim 1 wherein the control body has a second inlet end in the vessel, a second outlet opening to the ambient atmosphere, a second fluid passageway fluidly connecting the second inlet to the second outlet and a relief device fluidly connected to the second inlet for permitting the exhausting of high pressure fluid through the second passageway upon being exposed to at least one of a pressure and a temperature exceeding a preselected level.

4. The gas control assembly of claim 1 wherein the valve stem has upper and lower end portions that are axially opposite the valve seat and a reduced diameter portion axially intermediate the valve stem upper and lower portion that extends axially through the valve seat.

5. The gas control assembly of claim 4 wherein the valve reduced diameter portion and the control body provide an annular clearance space axially opposite the valve seat from the inlet, the valve stem end portions are in fluid sealing relationship with the control body and the passageway includes said clearance space and a passage fluidly connecting the clearance space to the on-off valve.

6. The gas control assembly of claim 4 wherein the enlarged diametric portion is axially intermediate the valve stem lower end portion and the valve seat for abutting against the valve seat to block fluid flow therethrough, a relief device is provided exterior of the vessel when the threaded portion is threaded to the neck for permitting the exhausting of high pressure fluid therethrough when exposed to at least one of a pressure and a temperature exceeding a preselected level and the relief device opens to the passageway intermediate the valve seat and the passageway inlet.

7. The gas control assembly of claim 4 wherein the control body inner end portion has an inner peripheral wall portion defining an axially elongated bore, and an axially elongated fitting removably mounted in the inner end portion bore to in conjunction therewith define an axially elongated clearance space that at least in part is in surrounding relationship to at least one of the valve stem end portions and radially spaced therefrom, the fitting having an axial bore into which the said at least one of the valve stem end portions axially movably extends and the passageway includes said clearance space.

8. The gas control assembly of claim 7 wherein the pressure regulator is incorporated in the control body outer end portion in the passageway intermediate the on-off valve and the main outlet and the on-off valve and pressure regulator are mounted to the assembly outer end portion.

9. The gas control assembly of claim 8 wherein the control body has a second inlet end in the vessel, a second outlet opening to the ambient atmosphere, a second fluid passageway fluidly connecting the second inlet to the second outlet and a relief device is fluidly connected to the second inlet for permitting the exhausting of high pressure fluid through the second passageway upon the relief device being exposed to at least one of a pressure and a temperature exceeding a preselected level and the second passageway is in part defined by the valve stem having a bore extending axially therethrough.

10. The gas control assembly of claim 8 wherein the valve stem upper and lower portions are of the same outer diameters and are in fluid sealing relationship with the control body and the clearance space has one axial end opening to the valve stem lower end portion axially opposite the valve stem enlarged diametric portion from the valve seat.

11. The gas control assembly of claim 8 wherein the control body outer end portion has a pressure regulator bore and an annular part extending within the pressure regulator bore, the pressure regulator includes a piston having a piston bore extending axially therethrough and a regulator valve seat extending within the piston bore, the annular part extending in the piston bore in fluid sealing relationship with the piston being axially movable relative to the annular part between a first position blocking fluid flow and a second position permitting fluid flow, the regulator body bore in combination with the piston forming a control chamber that opens to the main outlet and to the piston bore, the piston includes means that in the piston first position permits flow from the annular part to the control chamber and in the piston second position acts in combination with the regulator valve seat to block fluid from the annular part to the control chamber and the pressure regulator includes means acting against the piston to move the piston from its second position to its first position when the pressure in the main outlet is below a preselected level, the annular part forming a part of the passageway that opens to the on-off valve and the piston bore and the piston means and the control chamber form part of the passageway.

12. A gas control assembly mountable to the threaded neck of a vessel containing fluid under pressure and extendable into the neck interior, comprising an assembly threaded portion for being threadedly mountable to the neck, an assembly inner end portion locatable in the vessel interior and an assembly outer end portion locatable exterior of the vessel when the threaded portion is threaded to the neck, a first fluid flow passageway extending within each of the assembly threaded, outer end and inner end portions and having a first end opening in the interior of the vessel and a main outlet opening to the ambient atmosphere when the threaded portion is threaded to the neck, a main valve in the first passageway and operable between an open position permitting fluid flow through the passageway and a closed position blocking fluid flow through the passageway, means for operating the main valve to its open position, said means including a solenoid mounted to the assembly outer end portion remote from the assembly inner end portion, said solenoid including a solenoid coil and a plunger movable to an extended position upon the coil being energized, a manually operated on-off valve in the passageway between the main valve and the passageway main outlet to permit blocking fluid flow through the passageway and a pressure regulator incorporated in the passageway intermediate the main valve-and the passageway main outlet.

13. The gas control assembly of claim 12 wherein an inlet check valve is mounted to the outer end portion to open to the passageway intermediate the main valve and the passageway inner end to permit pressurized fluid flowing to the passageway to increase the pressure of the fluid in the vessel and the on-off valve, and the pressure regulator is incorporated in the assembly outer portion in the passageway intermediate the on-off valve and the main outlet.

14. The gas control assembly of claim 13 wherein the pressure regulator includes a regulator bore, a valve seat, a piston having a piston bore extending axially therethrough with the valve seat extended in the piston bore, the passageway having a passageway part to permit fluid flow from the passageway first end to flow into the piston bore, the regulator bore in combination with the piston forming a control chamber, the passageway having a part that opens to the main outlet and to the control chamber and means acting against the piston to move it from a position blocking fluid flow from the piston bore to the control chamber to a position in the regulator bore and relative to the valve seat to permit fluid flow from the piston bore to the control chamber when the pressure in the main outlet is below a preselected level.

15. The gas control assembly of claim 14 wherein the main valve includes a valve seat disposed in the passageway and a relief device is provided exterior of the vessel when the threaded portion is threaded to the neck for permitting the exhausting of high pressure fluid therethrough from the vessel interior to the ambient atmosphere when exposed to at least one of a pressure and a temperature exceeding a preselected level, the relief device opening to the passageway intermediate the valve seat of the main valve and the passageway inlet.

16. The gas control assembly of claim 13 wherein the assembly outer end portion comprises a valve body portion external of the vessel when the assembly threaded portion is threaded to the neck, the valve body portion having the main outlet and the passageway extending therein and the solenoid is mounted to the valve body portion.

17. The gas control assembly of claim 16 wherein the valve body portion has a main chamber that is part of the passageway, the manually operated off-on valve is disposed intermediate the pressure regulator and the main chamber, the pressure regulator and valve body portion form a control chamber, the regulator has means for reducing the fluid pressure of the fluid flowing from the off-on valve to the control chamber and permitting fluid flow from the off-on valve to the control chamber when the fluid pressure at the main outlet is below a preselected level, a pressure sensor is mounted by the valve body portion to sense the pressure in at least one of the control chamber and at the main outlet, and an outlet relief device is mounted to the valve body portion to open to the passageway intermediate the on-off valve and the outlet to exhaust therethrough, fluid from the vessel when the fluid pressure is above a preselected level in the control chamber.

18. The gas control assembly of claim 16 wherein there is provided a second fluid flow passageway having one end opening to the vessel interior and a second end opening to the ambient atmosphere when the assembly threaded portion is threaded to the neck, and an axially elongated housing having the assembly threaded and inner end portions, an outer peripheral surface portion within the vessel interior when the assembly threaded portion is threaded to the neck and a first bore extending axially therethrough, the main valve includes a valve seat, a valve stem extending through the valve seat of the main valve and being movable between a closed position blocking fluid flow through the main valve valve seat and an open position and means in the housing first bore for resiliently urging the valve stem to its closed position, a relief device opens to the second passageway for blocking fluid flow through the second passageway until at least one of pressure and temperature exceeds a preselected level, the relief device opening to the housing first bore, the housing having a second bore opening through the peripheral surface portion and to the housing first bore axially opposite the valve seat from the first passageway first end, the housing first and second bores defining part of the first passageway.

19. The gas control assembly of claim 18 wherein the valve stem has a bore which extends axially therethrough and forms a part of the second passageway to permit fluid flow therethrough regardless of whether the valve stem is in either one of its open and closed positions and the assembly inner end portion includes an axially elongated fitting having an intermediate portion threadedly mounted to the housing and extending within the housing bore and an outer end portion, one of the fitting outer end and intermediate portions having the second passageway second end, the fitting has a passage in fluid communication with the valve stem bore and the second passageway second end and the fitting passage constitutes a part of the second passageway.

20. A gas control assembly mountable to the neck of a vessel for containing fluid under pressure and extendable into the vessel interior, comprising: an axially elongated housing having an outer end portion removably mountable to the neck of the vessel and an axial intermediate and inner end portions extendable within the vessel interior, said housing having a main bore extending axially therethrough, a relief device mounted to the housing inner end portion and opening to the housing bore for blocking fluid flow therethrough to the housing bore until exposed to at least one of a pressure and a temperature exceeding a preselected level and then permitting fluid flow therethrough, a fitting having an inlet end portion extending within the housing bore and an outer end portion outwardly of the vessel when the housing is mounted thereto, a valve body mounted to the fitting outer end portion and having a main outlet, at least one of the housing and fitting having a first fluid flow passageway opening through the housing bore to the relief device and to the ambient atmosphere through at least one of the housing outer end portion and the fitting outer end portion, the housing, fitting and valve body having a second fluid flow passageway for conducting fluid exterior of the housing from axially inwardly of the housing outer end portion to the main outlet, a main valve in the second passageway and operable between an open position permitting fluid flow therethrough and a closed position blocking fluid flow through the second passageway, said main valve being mounted in the housing bore, a solenoid mounted to the valve body remote from the housing, said solenoid having a solenoid coil and a plunger movable to an extended position upon energizing the solenoid coil and means for being moved by the plunger moving to its extended position to operate the main valve to its open position.

21. The gas control assembly of claim 20 wherein at least one of the fitting and valve body defines a main chamber, an inlet check valve is mounted to the valve body in fluid communication with the main chamber to have fluid under pressure applied therethrough to the main chamber while preventing fluid in the main chamber exhausting therethrough.

22. The gas control assembly of claim 21 wherein the main valve includes a valve seat, a valve stem axially movable between a valve open position and a closed position, said valve stem extending through the valve seat and having a bore extending axially therethrough, the first passageway in part being defined by the valve stem bore, and means for resiliently urging the valve stem to its valve open position.

23. The gas control assembly of claim 22 wherein the valve seat and at least one of the housing and fitting form first and second annular clearance spaces with the valve seat being axially therebetween and the first clearance space being axially more closely adjacent to the relief device than the second clearance space and a cross bore opening to the first clearance space and to the interior of the vessel when the housing is mounted to the vessel neck and the second passageway includes the first and second clearance spaces and the cross bore.

24. The gas control assembly of claim 23 wherein the fitting has a central bore extending axially therethrough, the fitting bore has an outer end, the means movable by the plunger is an axially elongated rod having one end abuttable against the plunger and an opposite end abuttable against the valve stem, the rod in combination with the wall defining the fitting bore forming a first passage axially elongated third clearance space that at one end opens to the valve stem bore and an opposite end, the fitting has a bore fluidly connecting the opposite end of the third clearance space and providing the opening of the first passageway to the ambient atmosphere when the housing Is mounted to the neck of the vessel.

25. The gas control assembly of claim 24 wherein the valve body has a bore extending therethrough and opening to the fitting bore, the valve body bore and the fitting having cooperating wall portions defining an annular main chamber which forms a part of the second passageway first end, the valve body has a passage opening to the main chamber which forms a part of the second passageway, an inlet check valve is mounted to the valve body and opens to the main chamber to permit high pressurized fluid flowing therethrough and into the main chamber while preventing fluid in the main chamber exhausting therethrough, a manually operated valve is mounted by the valve body to extend in the second passageway to permit blocking fluid flow through the second passageway, and a pressure regulator is provided in the valve body passage intermediate the manually operated valve and the main outlet for reducing the pressure of the fluid flowing from the main chamber to the main outlet.

26. The gas control assembly of claim 24 wherein at least one of the fitting and valve body defines a main chamber that comprises a part of the second passageway, the fitting extending through the main chamber and there is a pressure regulator in the second passageway between the main chamber and the main outlet for reducing the pressure of the fluid flowing from the main chamber to the outlet.

27. The gas control assembly of claim 26 wherein a manually operated off-on valve is disposed in the second passage intermediate the pressure regulator and the main chamber, the pressure regulator and valve body form a control chamber, the regulator has means for reducing the fluid pressure of the fluid flowing from the off-on valve to the control chamber and permitting fluid flow from the off-on valve to the control chamber when the fluid pressure at the main outlet is below a preselected level, a pressure sensor is mounted by the valve body to sense the pressure in at least one of the control chamber and at the main outlet, and an outlet relief device is mounted to the valve body to open to the second passageway intermediate the control chamber and the main outlet to exhaust fluid when the fluid pressure is above a preselected level in the control chamber.

\* \* \* \* \*